United States Patent [19]
Kirkpatrick

[11] Patent Number: 5,933,776
[45] Date of Patent: Aug. 3, 1999

[54] METHOD AND APPARATUS FOR FIELD TESTING CELLULAR TELEPHONES

[75] Inventor: George Robert Kirkpatrick, Los Altos Hills, Calif.

[73] Assignee: Hewlett-Packard Company, Palo Alto, Calif.

[21] Appl. No.: 08/889,125

[22] Filed: Jul. 7, 1997

[51] Int. Cl.[6] .................................................. H04B 1/00
[52] U.S. Cl. .......................................... 455/423; 455/67.1
[58] Field of Search ................................. 455/67.1, 67.4, 455/67.7, 226.1, 409, 423, 424, 425; 379/1, 5, 6, 10, 12, 16, 24, 27, 28, 29

[56] References Cited

U.S. PATENT DOCUMENTS

| | | | |
|---|---|---|---|
| 5,031,204 | 7/1991 | McKernan | 455/560 |
| 5,046,132 | 9/1991 | Trefney | 455/127 |
| 5,297,193 | 3/1994 | Bouix et al. | 455/424 |
| 5,425,076 | 6/1995 | Knippelmeier | 455/424 |
| 5,706,333 | 1/1998 | Grenning et al. | 455/423 |

*Primary Examiner*—Reinhard J. Eisenzopf
*Assistant Examiner*—Makoto Aoki

[57] ABSTRACT

An apparatus and method by which a terrestrial based or satellite based cellular telephone is tested in-service, preferably at a retailer location, to identify the source of a cellular telephone user's dissatisfaction and to aid the retailer in resolving the issue. Test equipment is embedded within the cellular telephone network to captures currently available but unrecognized information relating to cellular telephone operation from a known location, i.e. the retailer's location, having known performance parameters. In this way, network related problems, such as fading, are eliminated. This allows cellular telephone performance to be evaluated and further allows various cellular telephone functions to be simulated. The invention thus allows identification of the nature of cellular telephone user dissatisfaction.

13 Claims, 8 Drawing Sheets

METHOD AND APPARATUS FOR FIELD TESTING CELLULAR TELEPHONES

BACKGROUND OF THE INVENTION

1. Technical Field

The invention relates to cellular telephones. More particularly, the invention relates to a method and apparatus for the field testing of cellular telephones.

2. Description of the Prior Art

Recently, the rate at which new telephone area codes have been added has increased. Although each area code has the potential to provide about one million additional telephone numbers, this capacity is apparently insufficient. It is thought that the increased need for area codes is a direct result of the tremendous demand for additional telephone numbers, which is due in large part to the nearly exponential growth in use of cellular telephones, i.e. consumers are enthusiastically embracing the cellular telephone concept.

Presently, there is significant cellular telephone user dissatisfaction with cellular telephone service, e.g. because a cellular telephone cannot make a connection (upon initiating or receiving a telephone call) or because such telephone drops a connection during a conversation (for example during a handoff sequence as the user moves from one cellular sector to another sector). This dissatisfaction is often expressed as a complaint that the telephone is not working properly. Such complaint is directed by consumers to the retailers from whom the cellular telephone was purchased. Because retailers do not typically service cellular telephones, their customer's complaints are forwarded to the various hardware repair organizations that do service cellular telephones.

Consumers also express their dissatisfaction with the service providers that bill them for cellular services. The service providers provide their customer's complaints to base station installers who are responsible for operating the field equipment that enables cellular telephony. While some of these complaints are system related, most such complaints relate to the consumer's cellular telephone. Although some of these complaints are readily resolved by instructing the consumer in the proper operation of the cellular telephone, much frustration and dissatisfaction with cellular telephone service could be avoided if an early diagnosis of cellular telephone disfunction could be made.

The cellular telephone industry includes cellular telephone retailers, cellular telephone manufacturers, hardware service providers, base station manufacturers, base station owners, and cellular service providers. There is presently no mechanism for coordinating the resources of these many sectors of the cellular telephone industry. However, because the cellular telephone industry is customer driven (as with any business), the cellular telephone industry could derive significant benefit from the improved customer satisfaction that would result from a mechanism for effecting early resolution of user complaints by testing in-service cellular telephones. Such early resolution of technical complaints would also serve to save the industry significant costs in handling and testing otherwise serviceable cellular telephones.

SUMMARY OF THE INVENTION

The invention provides an apparatus and method by which a terrestrial based or satellite based cellular telephone is tested in-service, i.e. in the field, preferably at a retailer location, to identify the source of a cellular telephone user's dissatisfaction and to aid the retailer in resolving the issue. The invention provides test equipment that is embedded within the cellular telephone network. The test equipment captures currently available but unrecognized information relating to cellular telephone operation, based upon operation of the cellular telephone at a known location, i.e. the retailer's location, having known performance parameters. In this way, network related problems, such as fading or hand-off issues, are eliminated or controlled in the testing and evaluation process. This allows cellular telephone performance to be evaluated and further allows various cellular telephone functions to be simulated. If a fault is found, the retailer takes appropriate action to repair or replace the cellular telephone. If no fault is found, the retailer can address errors in operation or dissatisfaction with sound quality. These issues are thus resolved through training or adjusting the cellular telephone.

BRIEF DESCRIPTION OF THE DRAWINGS

FIG. 7a is a block schematic diagram showing a cellular telephone base station that includes a measuring emulator and modem according to the invention;

FIG. 7b is a detailed block schematic diagram of the measuring emulator and modem shown in FIG. 7a;

FIG. 8a is a block schematic diagram showing a cellular telephone retailer location and a cellular telephone base station according to the invention; and FIG. 8b is a flow diagram showing a test transaction between the cellular telephone retailer location and the cellular telephone base station shown in FIG. 8a.

DETAILED DESCRIPTION OF THE INVENTION

The invention is provided, at least in part, as the result of the recognition that a typical cellular telephone user has expressed a need for a cellular telephone by purchasing the telephone and service therefor. When the cellular telephone user is dissatisfied, it is incumbent upon the retailer, service provider, and other members of the cellular telephone industry to identify and resolve the issue quickly. Because retailer is typically the first contact for the cellular telephone user, the retailer serves as an interface between the user and cellular telephone service for substantially all consumer issues. To remain profitable, the retailer must reduce its cost of doing business by minimizing the time spent with each cellular telephone user on such matters as service.

Accordingly, the retailer must resolve cellular telephone user issues without maintaining a large technically trained staff.

The service provider typically directs cellular telephone user complaint calls to a participating retailer to resolve equipment related user issues satisfactorily. The service provider also must control its costs of doing business by minimizing the time spent with each dissatisfied cellular telephone user.

The repair service provider must minimize the number of cellular telephones that test as "no problem found." The repair service provider needs to minimize repair and turn around time to be competitive, which is facilitated by receiving only pretested telephones from the retailer. Therefore, the retailer must separate the telephones that test good from those that test bad, and supply the repair service provider with accurate data about what function within the telephone is not operating to an acceptable standard. The invention is concerned with providing a new service that includes a test environment to accomplish such testing, e.g. at the retailer's location.

The invention provides an apparatus and method by which a terrestrial based or satellite based cellular telephone is tested in-service, preferably at a retailer location, to identify the source of a cellular telephone user's dissatisfaction and to aid the retailer in resolving the issue. The invention provides a system in which test and measurement equipment is embedded within a cellular telephone network. This embedded equipment captures information that is currently available within the cellular telephone network, but that is unrecognized information (that is, information that is available within existing cellular network equipment, but that is presently unused for purposes of testing cellular telephones). This information relates to cellular telephone operation from a known location, i.e. the retailer's location, having known performance parameters. The embedded equipment also provides various test functions the are used to simulate such conditions as varying received signals levels and hand off. In this way, network related problems, such as fading, are eliminated from the test and can therefore be simulated to determine whether of not a subject cellular telephone is operating within its specifications. This allows cellular telephone performance to be evaluated and further allows various cellular telephone functions to be simulated.

A preferred embodiment of the invention provides a cellular telephone test service by adding hardware and software to the existing cellular telephone infrastructure. The cellular telephone test service herein described is scaleable, e.g. it can address a single telephone type manufactured by one of the many cellular telephone manufacturers, it can address a single base station manufacturer, or it can address a single service provider. The invention can also be implemented in a single metropolitan area having a scattering of retailers. However, the invention can also potentially include the entire cellular telephone industry.

Figure 1:
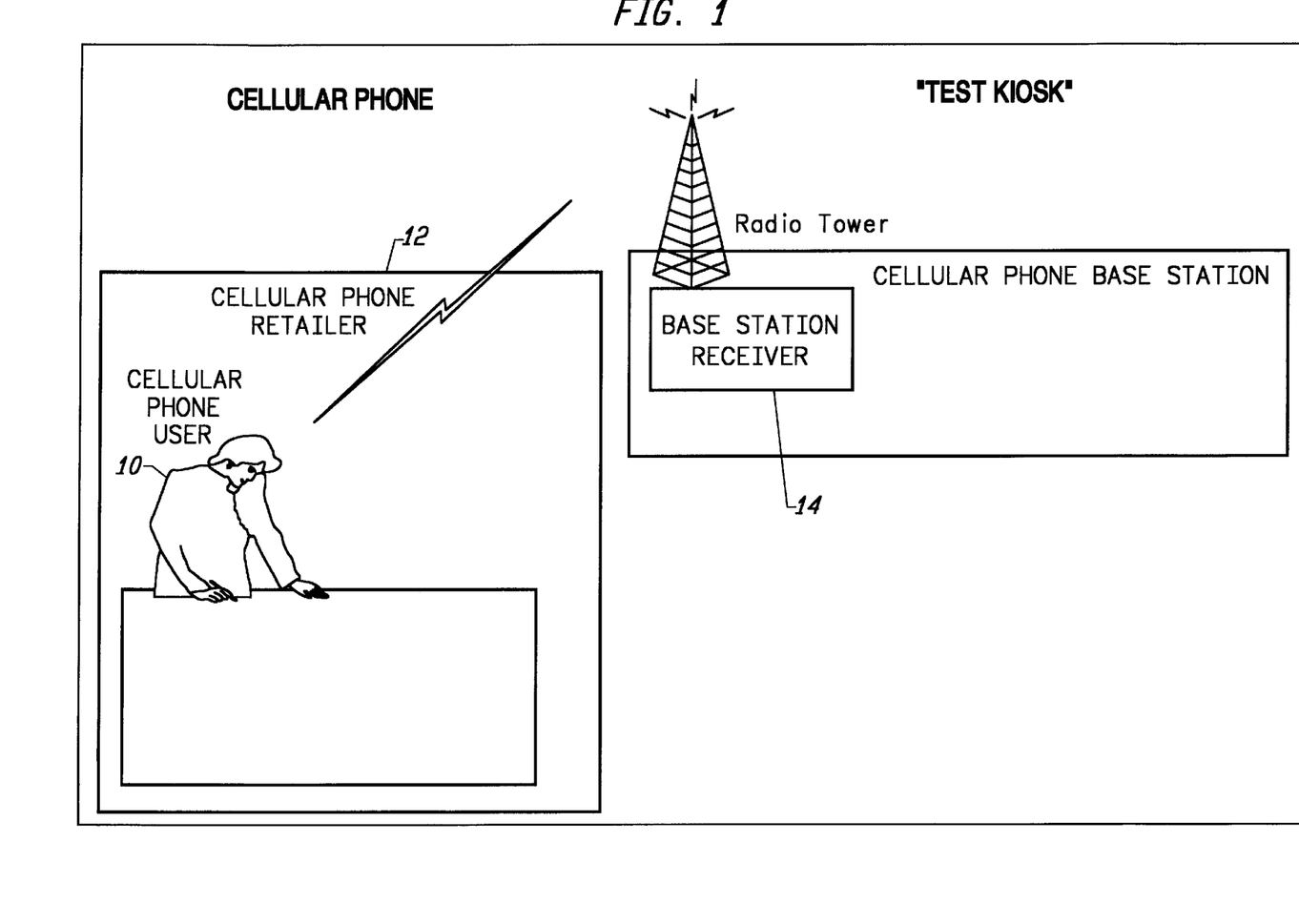
FIG. 1 is a block schematic diagram showing a system for resolving cellular telephone user issues according to the invention.

FIG. 1 is a block schematic diagram showing the initiation of a cellular telephone test according to the invention. In FIG. 1, a dissatisfied cellular telephone user 10 contacts a participating retailer 12 with a complaint about his or her cellular telephone service. In the preferred embodiment of the invention, the cellular telephone user is instructed to bring his telephone to the retailer's location. This location has been characterized for an ideal telephone by a test device embedded in a cellular telephone base station 14 (see FIG. 3) with regard to such factors as, e.g. signal strength, accessibility, and fading. The test device may be embedded into existing cellular network equipment or it may be included in newly manufactured cellular network equipment.

A key aspect of the invention is this characterization of the retailer's location (or any other test location) with regard to transmission characteristics. In this way, such factors as coverage, dead spots, and local interference are resolved and/or characterized before a telephone is tested. As such, the cellular telephone network and access thereto is not an issue that may affect test results. Thus, the cellular telephone user initially tests his telephone by initiating a call to the cellular telephone base station from the retailer's location by dialing a special test number using the telephone in question.

Figure 2:
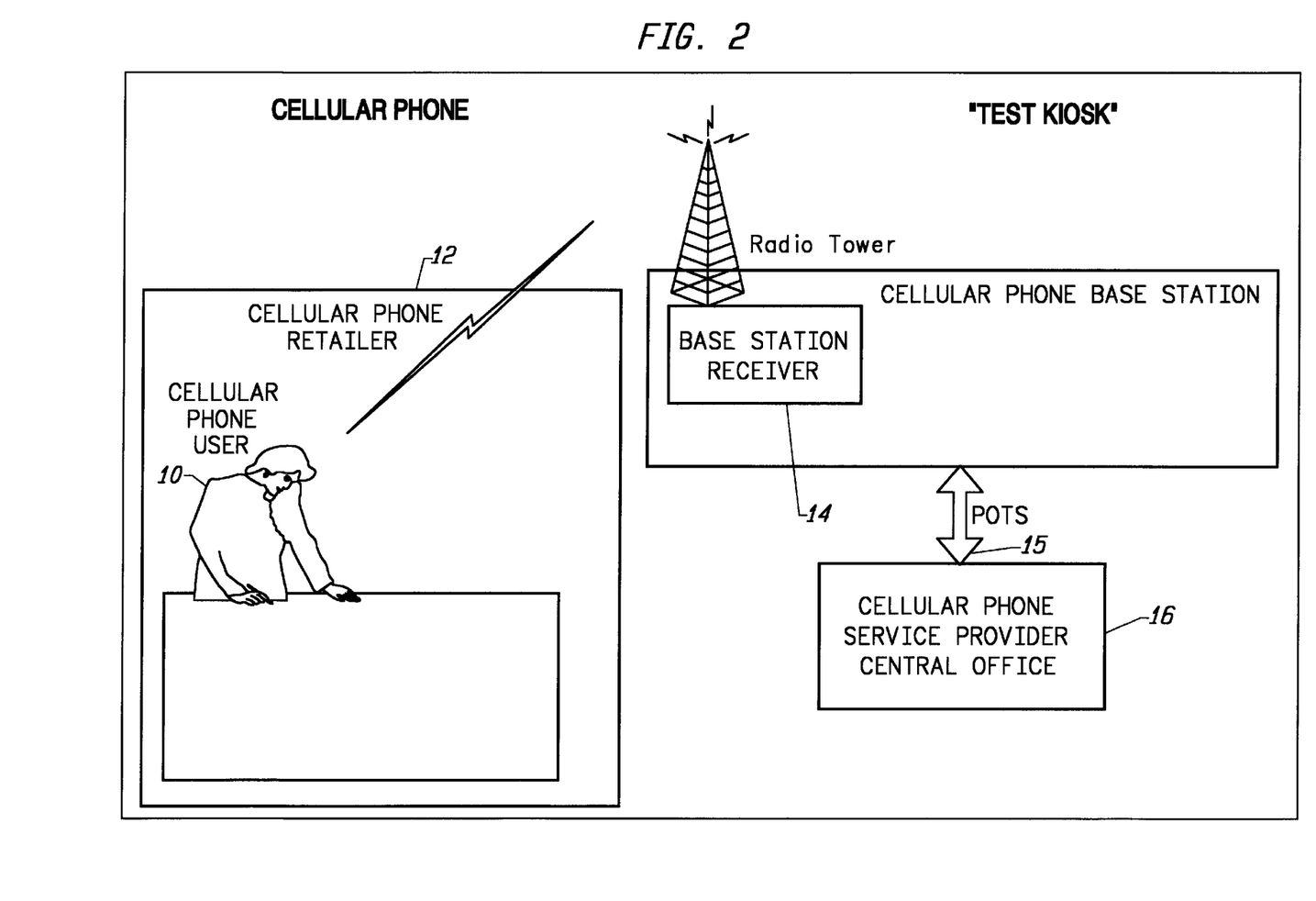
FIG. 2 is a block schematic diagram showing the initiation of a test session with a cellular telephone service provider central office pursuant to the system for resolving cellular telephone user issues according to the invention.

FIG. 2 is a block schematic diagram showing the establishment of a test session with the central office of a cellular telephone service provider 16. Such session typically uses the existing cellular telephone network to maintain communications between the telephone being tested and the cellular telephone service provider. The cellular telephone network provides a system that routes the cellular telephone user's signals as is known in the art, for example, between the cellular telephone base station 14 and the central office 16 via a standard telephone line POTS 15 which provides data exchange therebetween.

Although the invention is described in connection with a test performed via a retailer's facilities, other scenarios are contemplated within the scope of the invention. For example, the invention alternatively allows the user to contact his or her service provider 16. In this latter example, the service provider either provides the test at a test location or informs the cellular telephone user of the service available from a participating retailer 12 or other location.

In the preferred embodiment of the invention, the participating retailer 12, at the retailer's location, provides the cellular telephone user with a special phone number for contacting the test service via the service provider. With the retailer's help the cellular telephone user initiates a call to the network. A test call is initiated by the cellular telephone user 10 from the retailer's location 12 via the base station 14 to the service provider central office 16 (FIG. 2) where the cellular telephone user is identified. As a result of the test call, various information is now available to the system including, for example:

The name and address of the dissatisfied cellular telephone user (e.g. from subscriber records).

The type and serial number of the cellular telephone (e.g. from subscriber records).

The name and address of the participating retailer (e.g. from the phone number called).

The name and address of the participating hardware service provider (e.g. from prearranged commitments by the retailer).

The name and address of the cellular telephone manufacturer (e.g. from service provider records).

The warranty status of the cellular telephone (e.g. from service provider records).

Figure 3:
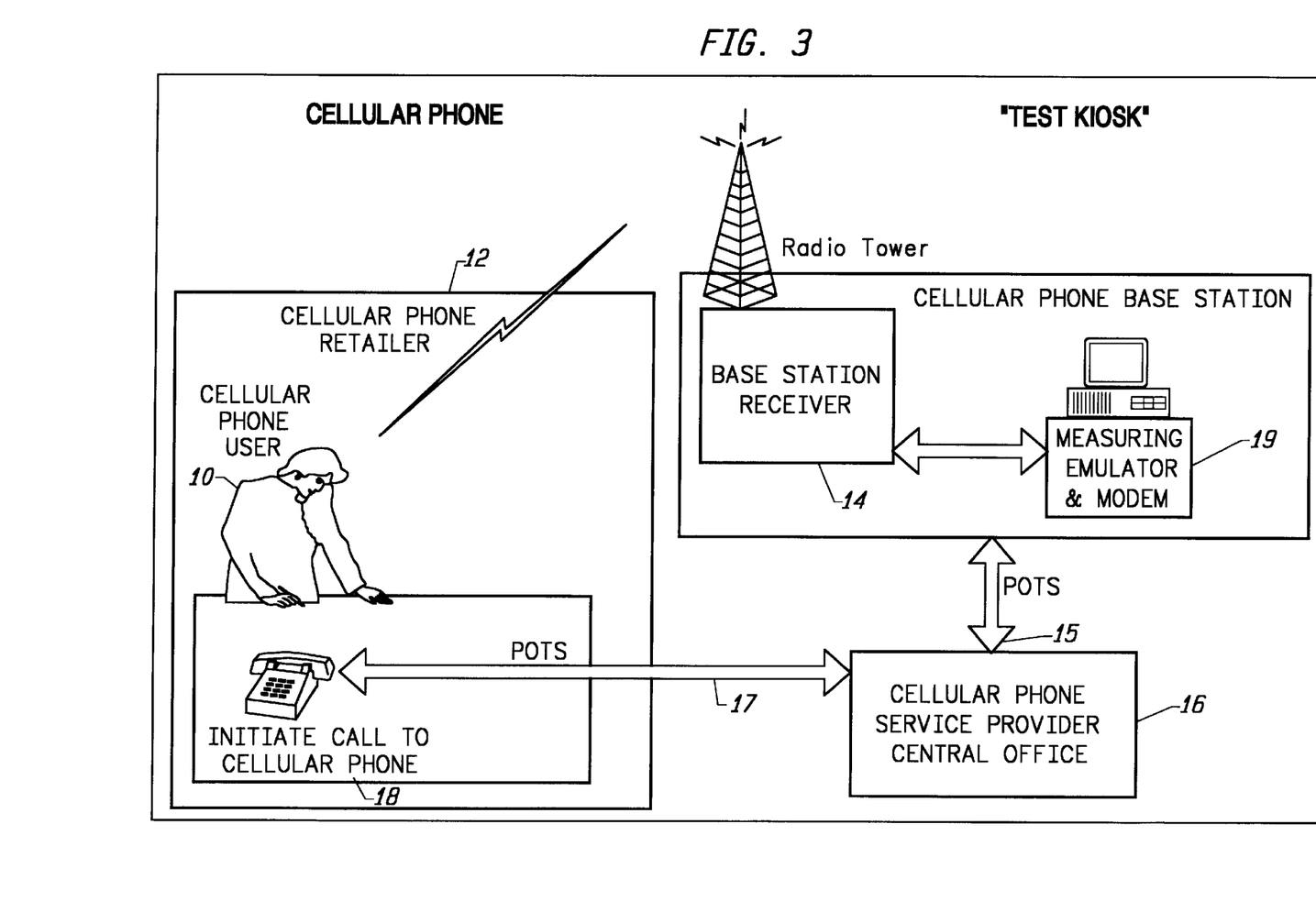
FIG. 3 is a block schematic diagram showing an embedded test apparatus within the system for resolving cellular telephone user issues according to the invention.

FIG. 3 is a block schematic diagram showing an embedded test apparatus for use within a system that implements the invention. The test is alternatively initiated via the retailer's telephone 18 using a standard telephone line (POTS) 17 if the cellular telephone is unable to initiate the call, for example where the user's telephone may be unable to establish a session by initiating a call, but may still be able to receive a call.

A test device, e.g. measuring emulator hardware (e.g. a signal source and measuring circuit) and/or software (e.g. a test module) 19 located in the base station 14 controls the test. The test results are evaluated to determine various cellular telephone faults. If faults are detected, the type of faults are identified. If no fault is detected, the test module alerts the cellular telephone user of errors in operation. For example, if dissatisfaction with sound quality is the problem, the retailer may suggest a cellular telephone upgrade. The tests themselves include such functions as simulating a hand off, testing signalling, varying signal levels to simulate fading and to characterize both transmit signal strength and receiver sensitivity, and testing telephone features, such as sound quality, keypad operation, and data exchange capability (in the case of a digital cellular telephone or where a cellular modem is used).

After the test, more information is available to the system including, for example:

Does the cellular telephone have a fault and if so, the type of fault?

Does the cellular telephone user need training in telephone operation?

Is the cellular telephone user dissatisfied with the sound quality?

Figure 4:
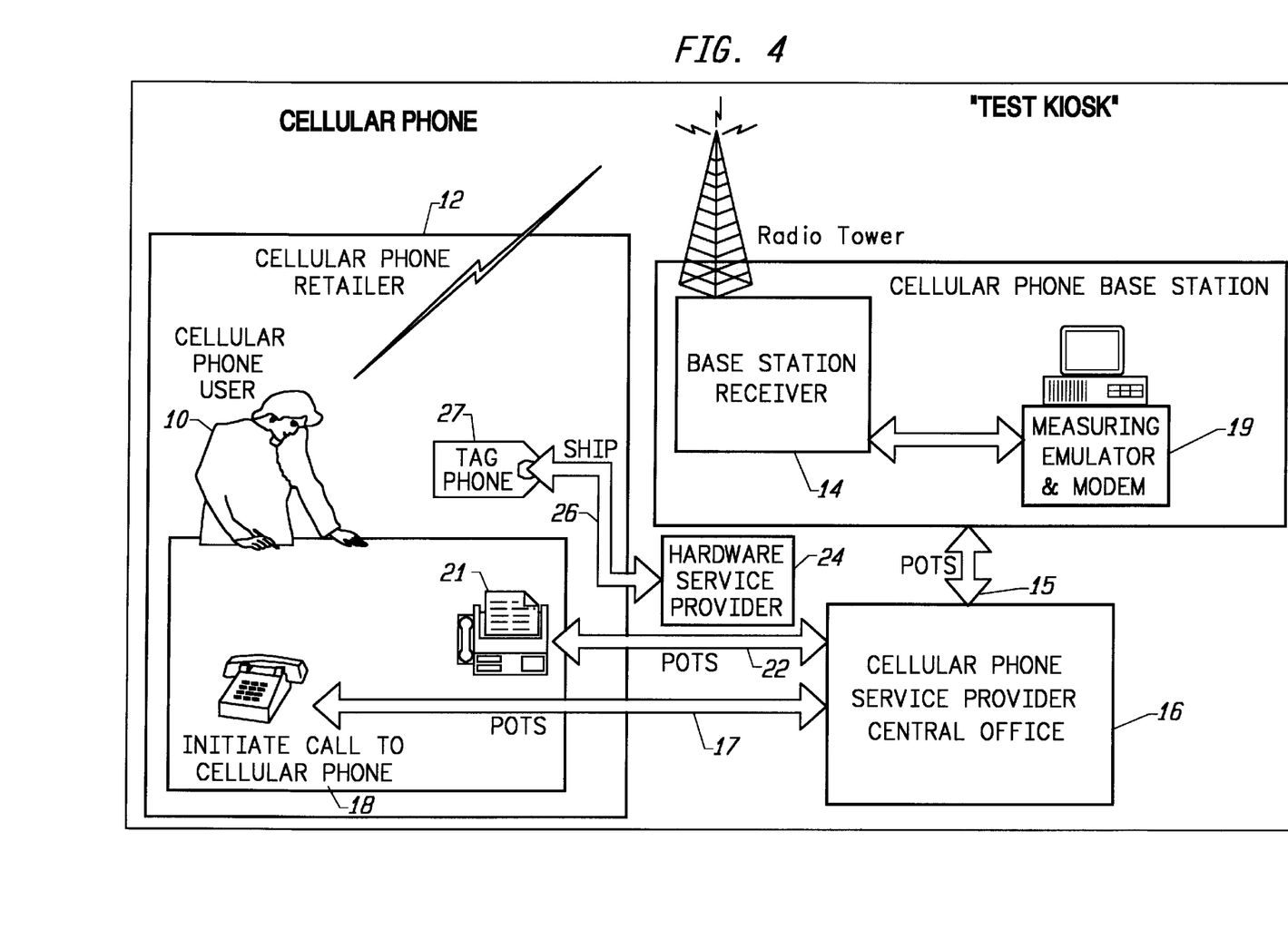
FIG. 4 is a block schematic diagram showing a reporting procedure pursuant to the system for resolving cellular telephone user issues according to the invention.

FIG. 4 is a block schematic diagram showing a reporting procedure according to the invention. As a result of the test, a number of reports can be prepared and disseminated to appropriate recipients. For example, a report may be sent to the cellular telephone user 10 via a standard telephone line 22 to the retailer's fax 21, indicating the condition of the cellular telephone, e.g. the transmitter is not within an acceptable range of power levels, the receiver is insensitive to weak signals, the signalling circuitry is not operating properly (hence, hand off may be compromised). A report may also be sent to the retailer via the retailer's fax, indicating the condition of the cellular telephone, the reason for the cellular telephone user's dissatisfaction, and/or the next step, e.g. fix or replace the cellular telephone, train the cellular telephone user, suggest an equipment upgrade, or perform a free repair as part of a defective telephone recall program.

The system may also send a pre-addressed tag 27 to the retailer on which cellular telephone faults are identified, for use when shipping 26 the cellular telephone to a hardware service provider 24 for repair. The tag 27 is used when the cellular telephone is sent to the hardware repair service to identify the type of fault is encountered during the test sequence. One advantage offered by the invention is that cellular telephones that test within preestablished tolerances are not returned for repair. This saves both the repair service and retailer time that would otherwise be spent in examining and returning an otherwise properly functioning telephone.

A report may also be sent to the cellular telephone service provider 16 via standard telephone lines 15 providing, for example, the name and address of the dissatisfied cellular telephone user along with the nature of the problem and the type of cellular telephone. This information may be used for marketing follow up, for example to advise the user of upgraded service, such as digital service. The information may also be used to help the service provider identify areas within their service region that do not provide adequate coverage, for example where a telephone tests within acceptable limits at the retailer's location but does not provide satisfactory service at the user's location. Over time, the service provider can collate such information to develop a coverage map that shows, for example, dead spots, i.e. regions within a sector from which a call cannot be placed and/or received.

Reports may be sent to base station owners and installers, as well as base station manufacturers, thereby providing data that shows a concentration of complaints, which can indicate a need for preventive maintenance and/or system compatibility problems with a particular brand of cellular telephone. Additionally, reports can be sent to the cellular telephone manufacturer including, for example, the cellular telephone type and serial number, the condition of the cellular telephone, the reason for the cellular telephone user's dissatisfaction, and/or compatibility problems with a particular brand of base station.

Because the invention is seen as providing a unique and needed value added feature, it is thought that such service will be supported by the various businesses that make up the cellular telephone industry, i.e. the retailer, the service provider, and the manufacturers. As such, it thought that the service may be offered based upon a fee that may be paid by either the user or by any one or more of these businesses. Accordingly, the invention includes various transaction accounting features.

Figure 5:
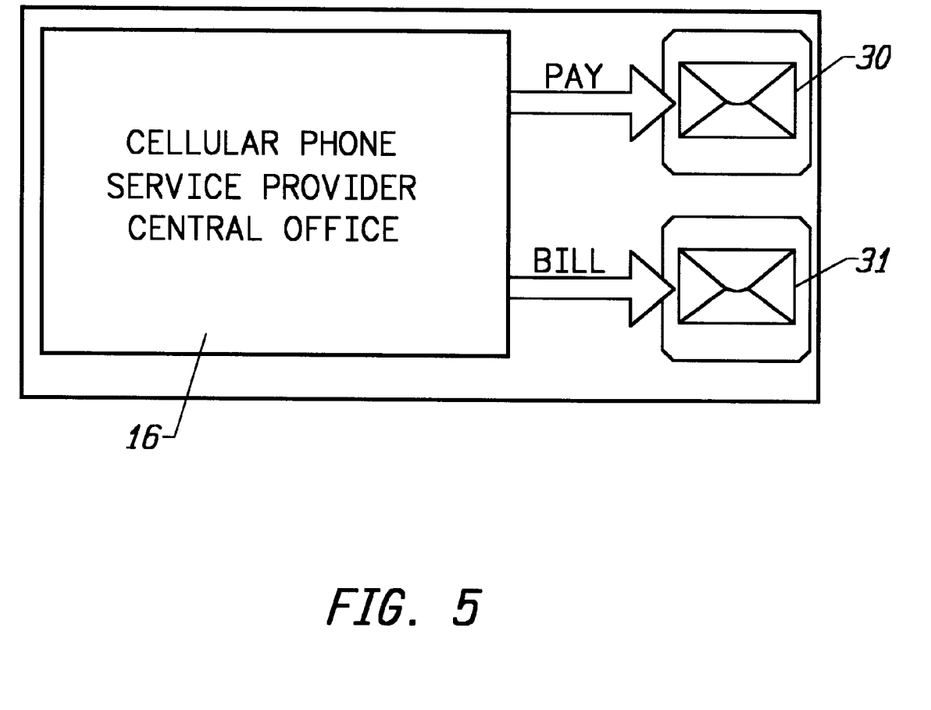
FIG. 5 is a block schematic diagram showing an example of one of a number of transactions that can be captured and disseminated pursuant to one embodiment of the invention.

FIG. 5 is a block schematic diagram showing an example of one of a number of transactions that can be captured and sent in one embodiment of the invention. In FIG. 5, the cellular telephone service provider 16 bills 31 the retailer or cellular telephone user for their use of the testing service. If the service is provided to the cellular telephone service provider by a third party, then the third party may be paid 30. The invention contemplates a scheme in which billing can be distributed proportionally among the entities receiving value, and in which revenue can be distributed proportionally among the entities providing value. Thus, the example shown on FIG. 5 shows two channels by which billing and revenue are distributed, i.e. "pay" and "bill."

Figure 6:
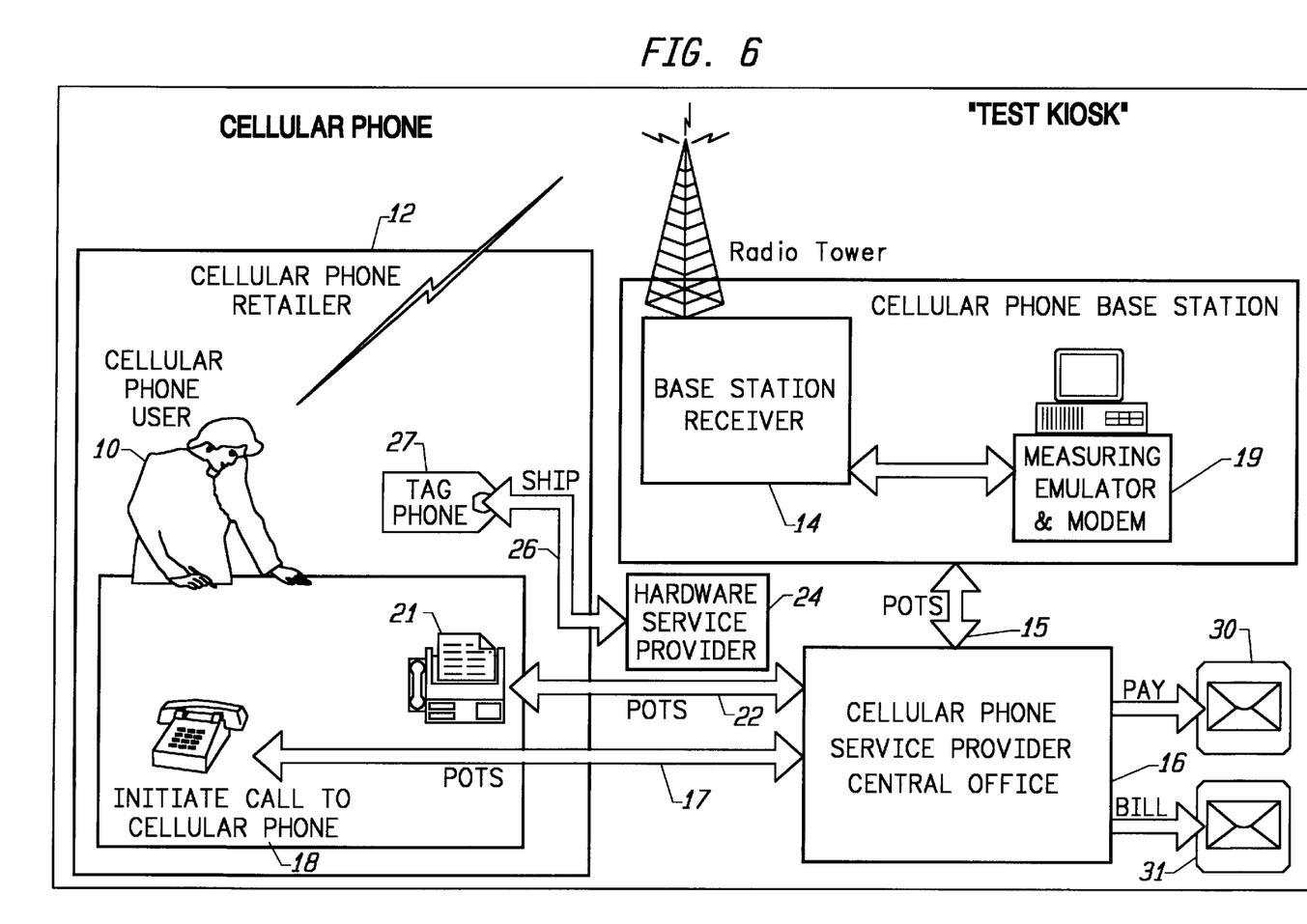
FIG. 6 is a block schematic diagram showing a system that captures testing-related transactions according to the embodiment of the invention set forth on FIG. 5.

FIG. 6 is a block schematic diagram showing various transactions that can be captured and sent in the embodiment of the invention set forth on FIG. 5. In this example, the "pay" and "bill" channels are shown emanating from the cellular telephone service provider's central office. It should be appreciated that the invention is readily adapted to any sort of transaction accounting scheme. For example, in some embodiments of the invention the cellular telephone testing service may be provided as a "no-charge to the consumer" value added service feature, where any of the retailer, cellular telephone service provider, or other cellular system enterprises pay the all or part of the cost of the service.

Further, while other points may be used in the system to capture and distribute both test information and transaction information, it is presently preferred that such information be captured and distributed via the service provider's central office. This is because the invention is readily adapted to existing cellular telephone networks and, as such, may readily take advantage of both the signalling equipment and the accounting functions that already exist within the service provider's facilities.

For example, it is not necessary to replace existing base station equipment to implement the invention. Rather, it is only necessary to provide a connection to such equipment by which the embedded test device, e.g. the measuring emulator 19, may measure received signal levels and may adjust transmitted signal levels during a test sequence, as well as operate various functions of the system, such as signalling. Thus, test capability in accordance with the invention may be added to a cellular network by providing a test module that automatically and sequentially operates functions already available at the base station and that collects information already within (but unrecognized by) the base station. Such operation and data collection are readily achieved via existing information ports and controls found on most cellular telephone base station and/or central office equipment.

The test equipment is set up such that a special test telephone number, once identified by the cellular network as having been called, initiates a test sequence as described herein. Identification of such number, when called, and activation of the test equipment to provide a test sequence are readily implemented in existing cellular telephone base station and central office equipment. Finally, existing accounting functions provided at the service provider's central office may be used to both capture and transmit test results, and to capture, apportion, and transmit billing and other accounting information.

Figure 7:
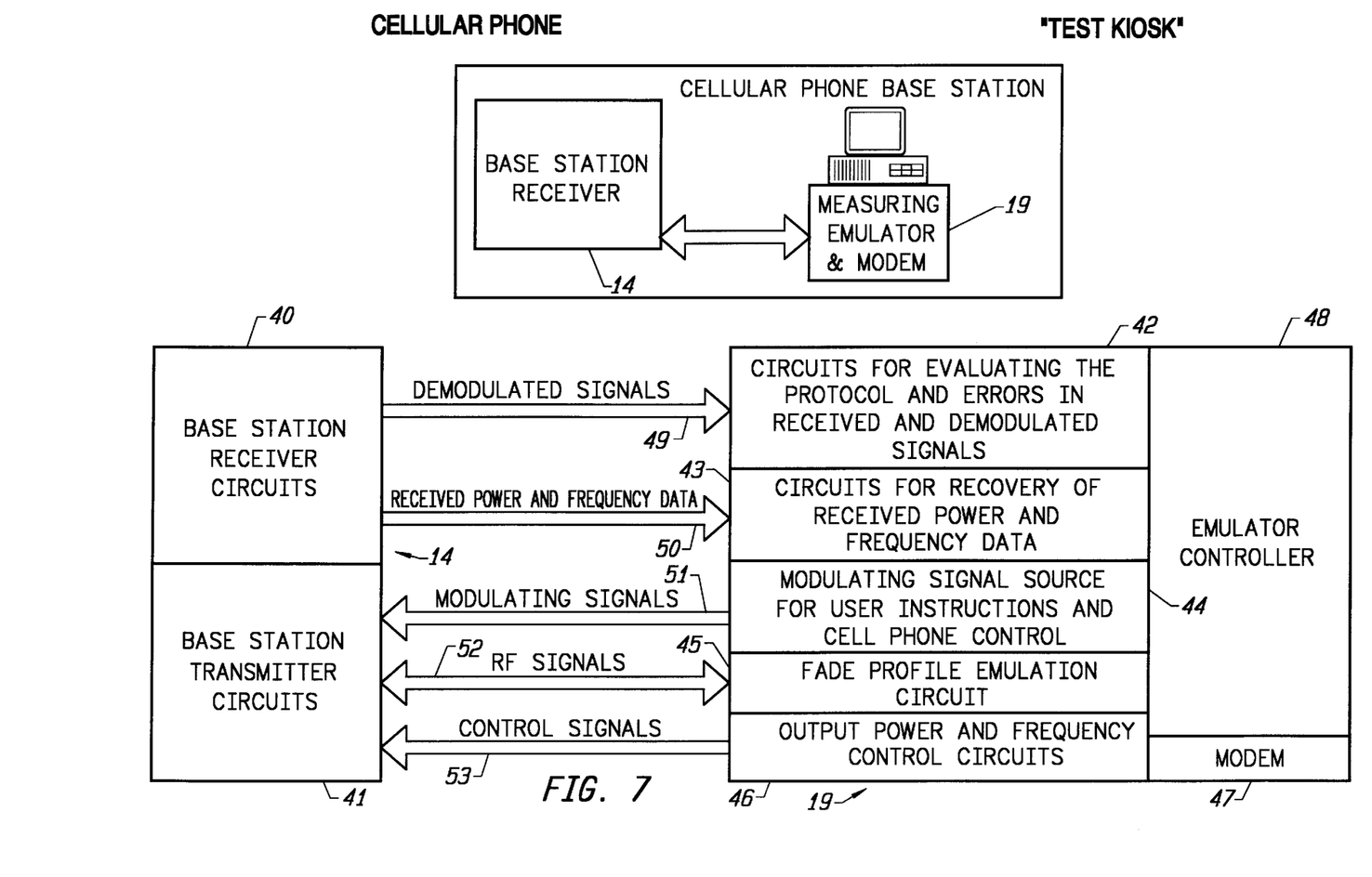

FIG. 7a is a block schematic diagram showing a cellular telephone base station that includes a base station transceiver 14 and a measuring emulator and modem 19 according to the invention. FIG. 7b is a detailed block schematic diagram of the base station transceiver 14 and measuring emulator and modem 19 shown in FIG. 7a. The base station transceiver includes base station receiver circuits 40 and base station transmitter circuits 41. The invention provides a system that exercises these circuits in a controlled way to effect various tests.

An emulator controller 48 executes various tests and generates reports based upon test results. In cooperation with the base station receiver circuits, the measuring emulator and modem 19 includes circuits 42 for evaluating the protocol and errors in received and demodulated signals 49. Circuits 43 are also provided for the recovery of received power and frequency data 50.

With regard to the base station transmitter circuits, the measuring emulator and modem 19 includes a circuit that produces modulating signals 51 for modulating a signal source for user instructions and cellular telephone control 44. Circuits are also provided for simulating fade profiles 45 by controlling transmitted RF signals 52; and control signals 53 are generated by output power and frequency control circuits 46.

Test results are communicated as discussed above via a modem 47 or other suitable means.

Figure 8:
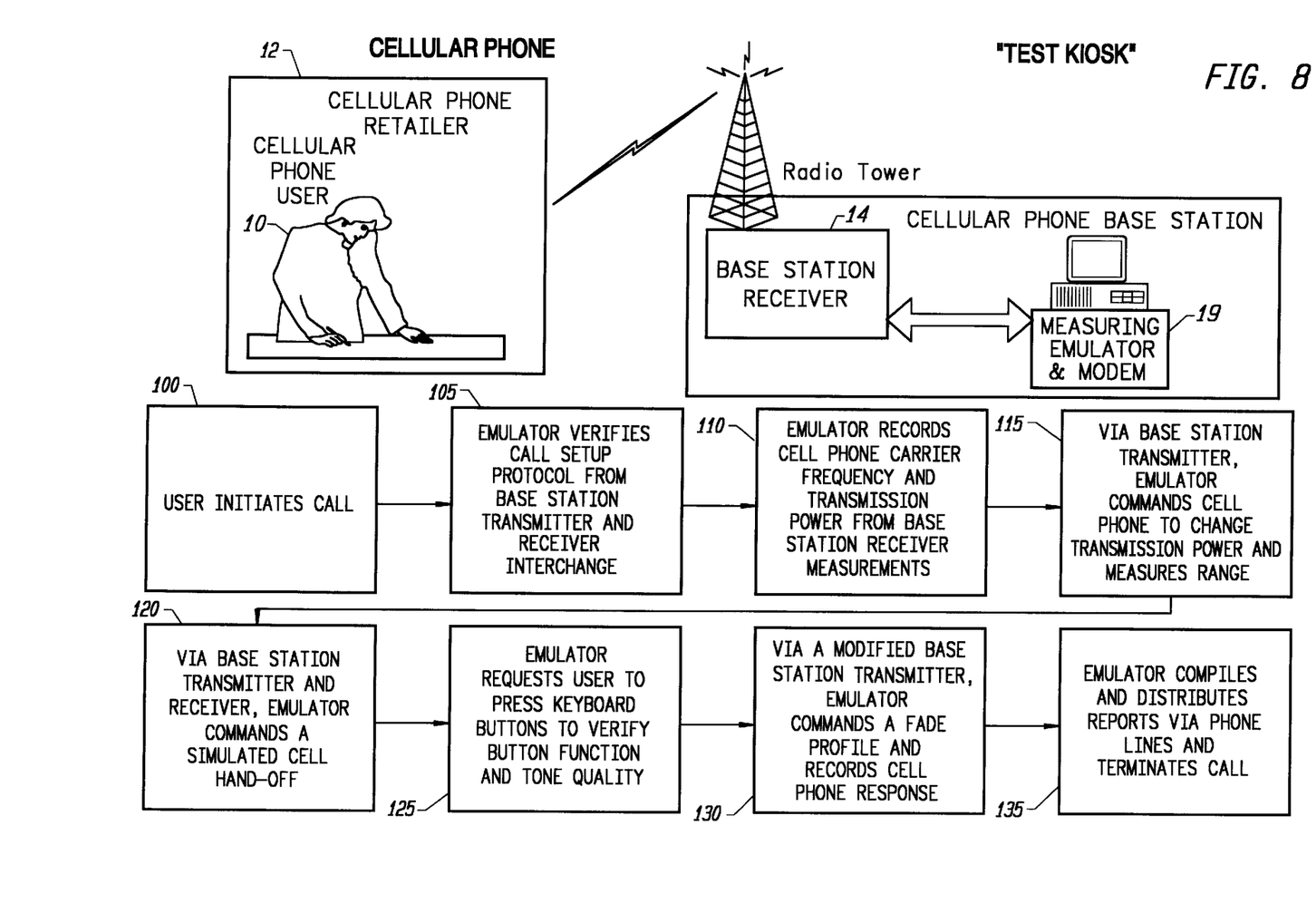

FIG. 8a is a block schematic diagram showing a cellular telephone user 10 initiating a test at a cellular telephone retailer location 12 and a cellular telephone base station, including a base station transceiver 14 and measuring emulator and modem 19 according to the invention. FIG. 8b is a flow diagram showing a test transaction between the cellular telephone retailer location and the cellular telephone base station shown in FIG. 8a. The user initiates a call (100) and the emulator verifies call setup protocol from the base station transmitter and receiver interchange (105). The emulator records information regarding the cellular telephone carrier frequency and transmission power, as recovered from base station receiver measurements (110). Via the base station transmitter, the emulator then commands the cellular telephone to change its transmission power to allow the emulator to measure the range of the cellular telephone (115). The base station transmitter and receiver are next used by the emulator to simulate a cell hand-of sequence (120). Next, the emulator requests the user to press the keyboard of the cellular telephone to verify button function and tone quality (125). If the base station transmitter is properly configured, for example by a retrofit modification, the emulator may use the transmitter to simulate a fade profile, from which the emulator may record cellular telephone response (130). Finally, the emulator compiles and distributes reports concerning test results, for example via the telephone line, and then terminates the call (135). It should be appreciated that the particular order of tests performed, as well as the specific test performed, is a matter of choice and that the forgoing is provided only for purposes of example.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A method for field testing cellular telephones, comprising the steps of:

initiating a telephone call with a subject cellular telephone from a location that has been characterized for an ideal telephone by a test and measurement device that is embedded in an existing cellular telephone network;

using said existing cellular telephone network to maintain communications between said subject cellular telephone and said test and measurement device, said cellular telephone network receiving signals transmitted by said subject cellular telephone and transmitting signals thereto;

using said test and measurement device to capture information that is currently available within said cellular telephone network, but that is unrecognized information relating to operation of said subject cellular telephone;

controlling operation of said cellular telephone network to effect one or more tests of said subject cellular telephone;

evaluating the results of said one or more tests to identify defects in said subject cellular telephone;

identifying the type of defects, if defects are detected; and alerting a user of said subject cellular telephone of errors in operation if no defects are detected.

2. The method of claim 1, wherein any of the following information is appended to results achieved by said one or more tests:

a name and address of a dissatisfied cellular telephone user;

a type and serial number of said subject cellular telephone;

a name and address of a retail participant at said location;

a name and address of a hardware service participant;

a name and address of the subject cellular telephone manufacturer; and warranty status of said subject cellular telephone.

3. The method of claim 1, wherein said one or more tests are alternatively initiated via a standard telephone line if said subject cellular telephone is unable to initiate a call.

4. The method of claim 1, wherein said one or more tests comprise any of:

simulating a hand off;

testing signalling;

varying signal levels to simulate fading and to characterize both transmit signal strength and receiver sensitivity; and testing telephone features, including any of sound quality, keypad operation, and data exchange capability.

5. The method of claim 1, further comprising the step of:
providing any of the following information regarding said subject cellular telephone as a result of said one or more tests:
whether said subject cellular telephone has a defect and if so, the type of defect;
whether a user of said subject cellular telephone needs training in telephone operation; and
whether said user of said subject cellular telephone is dissatisfied with the sound quality of said subject cellular telephone.

6. The method of claim 1, further comprising the step of:
preparing and disseminating one or more reports to appropriate recipients indicating any of the condition of said subject cellular telephone, the reason for said a user's dissatisfaction with said subject cellular telephone, a remediation, and that provides data that shows a concentration of complaints, which indicates any of a lack of cellular network coverage, a need for preventive maintenance, and system compatibility problems with a particular brand of cellular telephone.

7. The method of claim 1, further comprising the step of:
sending a pre-addressed tag to a retailer that identifies defects found in said subject cellular telephone as a result of said one or more tests, for use when shipping said subject cellular telephone to a hardware service provider for repair.

8. The method of claim 1, further comprising the step of:
capturing one or more transactions related to said one or more tests, wherein billing can be distributed proportionally among any entities receiving value as a result of said one or more tests, and in which revenue can be distributed proportionally among entities providing value in connection with said one or more tests.

9. The method of claim 1, wherein said test and measurement device is embedded within any of signalling equipment and accounting functions that already exist within a cellular network.

10. The method of claim 1, further comprising the step of:
using existing cellular network functions to capture and transmit test results, and to capture, apportion, and transmit billing and other accounting information.

11. An apparatus for field testing cellular telephones, comprising:
a test and measurement device adapted to be embedded within a cellular telephone network, said test and measurement device comprising a measurement circuit for capturing information that is currently available within said cellular telephone network, but that is unrecognized information relating to operation of a subject cellular telephone, said cellular telephone network receiving signals transmitted by said subject cellular telephone from a location having known performance parameters and transmitting signals thereto, said test and measurement device further comprising a test module adapted to control operation of said cellular telephone network to effect one or more tests of said subject cellular telephone, wherein said test module provides one or more test functions for simulating cellular network operation conditions during a test of said subject cellular telephone.

12. The apparatus of claim 11, wherein said measurement circuit measures received signal levels at said cellular network; and wherein said test module adjusts transmitted signal levels from said cellular network during said one or more tests.

13. The apparatus of claim 11, said test module comprising:
a test program that automatically and sequentially operates functions already available at a cellular network base station and that collects information already within, but unrecognized by, said cellular network base station.

* * * * *